INTERFERENCE SUPPRESSING CONTROL CIRCUIT FOR SWITCHING A SILICON CONTROLLED RECTIFIER
Filed May 16, 1968
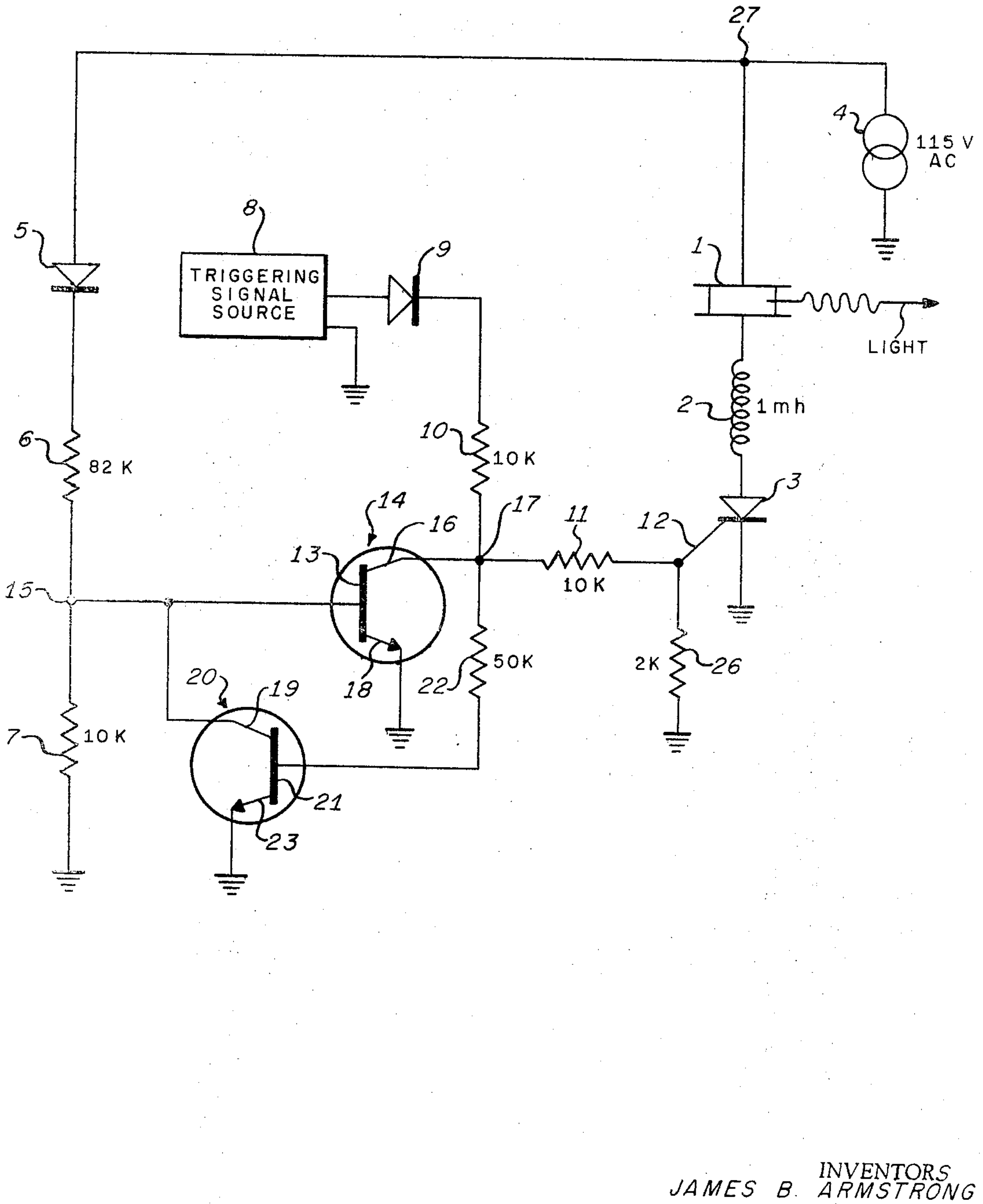
INVENTORS
JAMES B. ARMSTRONG
LAWRENCE T. FISHER
BY
Robert J. Haas
ATTORNEY United States Patent Office 3,521,123
Patented July 21, 1970

3,521,123

INTERFERENCE SUPPRESSING CONTROL CIRCUIT FOR SWITCHING A SILICON CONTROLLED RECTIFIER

James B. Armstrong, Phoenix, Ariz., and Lawrence T. Fisher, Las Cruces, N. Mex., assignors to Sperry Rand Corporation, a corporation of Delaware Filed May 16, 1968, Ser. No. 729,772
Int. Cl. H05b *37/02*
U.S. Cl. 315—194 4 Claims

ABSTRACT OF THE DISCLOSURE

A silicon controlled rectifier circuit for switching an electroluminescent lamp without generating objectionable radio frequency interference. A pair of transistors are reversely connected across the base and collector electrodes of each other so that the conduction of either transistor prevents conduction of the other transistor. One junction point of the connected transistors receives the alternating voltage which is applied to the anode and cathode of the rectifier; the other junction point receives a rectifier firing signal and is coupled to the rectifier gate. The transistors are operated so that the same one always conducts to clamp the aforementioned first junction point to ground except when the firing signal precedes the attainment of a certain voltage during the rise of the positive half cycle of the alternating voltage.

BACKGROUND OF THE INVENTION

The present invention generally relates to electroluminescent lamp switching circuits and, more particularly, to such circuits employing silicon controlled rectifiers. Silicon controlled rectifiers are well adapted for electroluminescent lamp switching applications. When the silicon controlled rectifier is in the non-conducting state (in the absence of a firing signal on the gate electrode), the rectifier is capable of blocking the relatively high amplitude alternating voltages required for the operation of electroluminescent lamps. When the silicon controlled rectifier gate electrode is supplied with the appropriate drive current, the rectifier exhibits transistor-like characteristics which permit it to supply sufficient current for maintaining the operation of an electroluminescent lamp even during the half cycle of the alternating voltage when the rectifier anode and cathode are back-biased.

It has been observed, however, that when silicon controlled rectifiers are used in electroluminescent lamp switching applications, undesirably high radio frequency interference is generated in the event that the rectifier is turned on during a time when the forward anode-to-cathode potential of the rectifier is above a certain value. Generally, the higher the forward anode-to-cathode potential at the moment the device is turned on, the higher the radio frequency interference output. Radio frequency interference is acceptably low for all values of anode-to-cathode potential during the reverse polarity half cycle of the applied alternating potential.

Prior art attempts to minimize radio frequency interference include the use of a capacitor to shunt the rectifier or the use of an inductor in series circuit with the rectifier. The former technique is not suitable for electroluminescent lamp switching applications because even a very small capacitor will conduct sufficient current to at least partially light a moderately sized electroluminescent lamp when the rectifier is turned off. The latter technique is satisfactory only with limited sized lamps drawing currents insufficient to saturate the inductor.

SUMMARY OF THE INVENTION

The invention provides for the reduction of radio frequency interference to acceptably low levels irrespective of when the silicon controlled rectifier is turned on. This desired result is achieved through the use of a pair of transistors connected to the gate electrode circuit of the rectifier for selectively inhibiting the application of a trigger signal for firing the rectifier. The transistor pair receive the trigger signal as well as the alternating voltage which is applied to the anode and cathode of the rectifier. In the event that the alternating voltage exceeds a certain value (during a positive half cycle) before the trigger signal occurs, one of the transistors is rendered conductive to ground out the triggering signal and preclude the conduction of the rectifier. In the inverse event that the trigger signal occurs prior to the time that the alternating voltage reaches the aforesaid predetermined value, the other transistor is rendered conductive, turning off the first transistor and allowing the application of the triggering signal to the gate electrode of the rectifier.

BRIEF DESCRIPTION OF THE DRAWING

The sole figure is a schematic representation of a preferred embodiment of the present invention.

DESCRIPTION OF THE PREFERRED EMBODIMENT

Electroluminescent lamp 1 is connected in series circuit with inductor 2 and the anode and cathode of silicon controlled rectifier 3 across alternating voltage source 4. Inductor 2 opposes sharply rising current surges through rectifier 3 and helps toward minimizing radio frequency interference caused thereby. Also connected across source 4 are diode 5 and resistors 6 and 7. A source 8 of trigger signals for firing rectifier 3 is connected via diode 9 and resistors 10 and 11 to the gate electrode 12 of rectifier 3. Gate 12 is connected to ground via resistor 26. The base 13 of transistor 14 is connected to the junction 15 between resistors 6 and 7. The collector 16 of transistor 14 is connected to the junction 17 between resistors 10 and 11. The emitter 18 of transistor 14 is connected to ground. The collector 19 of transistor 20 also is connected to the junction 15. The base 21 of transistor 20 is connected via resistor 22 to junction 17. The emitter 23 of transistor 20 is connected to ground. Typical electrical circuit parameter values are shown in the schematic diagram adjacent the respective components.

Silicon controlled rectifiers and electroluminescent lamps may be either series connected (shown in the sole figure) or shunt connected (not shown) relative to the alternating voltage source 4. In the series case, the conduction of the rectifier turns the electroluminescent lamp on. Conversely, the conduction of the rectifier in the shunt case turns the lamp off. In most applications, series operation is more desirable because current is drawn by the series switch only when the lamp is operating. Current is required in the shunt case during the full time that the lamp is turned off. The present invention, however, is directly applicable for use either with the series or shunt connections.

Rectifier 3 is readied for conduction during each half cycle of the alternating voltage from source 4 when the potential at point 27 rises positively with respect to ground. During the same half cycle, diode 5 conducts to apply a divided-down potential to junction 15. Transistor 14 would conduct at this time if no trigger signal from source 8 was present at junction 17. Transistor 20 would not tend to conduct due to the absence of a signal from source 8 on base 21. Once transistor 14 conducts, junction 17 is grounded until the next following negative half cycle of the voltage from source 4. However, if a trigger signal from source 8 had been applied to junction 17 prior to the positive-going half cycle of the potential at junction 15, transistor 20 would be rendered conductive. The trigger signal applied through resistors 10 and 22 conditions transistor 20 for conduction as soon as its collector potential rises to a sufficiently positive value. The conduction of transistor 20 effectively grounds junction 15 turning transistor 14 off. The non-conduction of transistor 14 permits the potential at junction 17 to follow the trigger signal and fire rectifier 3. The conduction of transistor 14, on the other hand, effectively grounds junction 17 precluding the application of a trigger from source 8 to gate 12 of rectifier 3. In effect, transistors 14 and 20 compete for conduction on each positive half cycle of voltage from source 4, the first to conduct preventing conduction by the other. Transistor 14 conducts first in the absence of a trigger signal. Transistor 20 conducts first in the presence of a trigger signal.

In the case of the preferred embodiment having the parameter values shown in the figures, if the trigger signal from source 8 does not occur prior to the time that the potential of source 4 reaches 10.5 volts during the positive half cycle, transistor 14 conducts precluding the firing of rectifier 3. If, on the other hand, the trigger signal precedes the time when the potential from source 4 reaches 10.5 volts, transistor 20 conducts, blocking conduction of transistor 14 and permitting the firing of rectifier 3. Thus, rectifier 3 is turned on only at times when the positive-going potential from source 4 has not yet reached levels which would produce current surges sufficient to cause the generation of objectionable radio frequency interference.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. An interference suppressing control circuit for switching a silicon controlled rectifier, said rectifier having a gate and having an anode and cathode connected across a first source of alternating voltage, said circuit comprising a second source of trigger signal, first and second transistors each having a base, a collector, and an emitter, the base of said first transistor being connected to the collector of said second transistor and to said first source, the collector of said first transistor being connected to the gate of said rectifier and to said second source, and impedance means, the base of said second transistor being coupled through said impedance means to the collector of said first transistor.

2. A control circuit as defined in claim 1 wherein the anode and cathode of said rectifier are connected in series circuit with an electroluminescent lamp across said first source.

3. A control circuit as defined in claim 1 wherein the anode and cathode of said rectifier are connected in series circuit with an electroluminescent lamp and an inductance across said first source.

4. A control circuit as defined in claim 1 wherein said impedance means comprises a resistor.

References Cited

UNITED STATES PATENTS

| | | | |
|---|---|---|---|
| 3,252,058 | 5/1966 | Close | 315—194 |
| 3,284,695 | 11/1966 | Weisz | 307—252 |

JERRY D. CRAIG, Primary Examiner

U.S. Cl. X.R.

307—232, 237, 252